(12) United States Patent
Takada

(10) Patent No.: US 6,997,615 B2
(45) Date of Patent: Feb. 14, 2006

(54) ROLLING BEARING APPARATUS (75) Inventor: Yoshito Takada, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 91 days.

(21) Appl. No.: 10/738,128

(22) Filed: Dec. 18, 2003

(65) Prior Publication Data
US 2004/0170345 A1 Sep. 2, 2004

(30) Foreign Application Priority Data
Dec. 20, 2002 (JP) .......................... P. 2002-370699

(51) Int. Cl.
F16C 19/28 (2006.01)

(52) U.S. Cl. .................................... 384/448

(58) Field of Classification Search ................ 324/173, 324/174, 207.25; 384/448, 446
See application file for complete search history.

(56) References Cited

U.S. PATENT DOCUMENTS

| 5,148,104 A | * | 9/1992 | Ishikawa | 324/173 |
| 5,296,805 A | * | 3/1994 | Clark et al. | 324/174 |
| 5,372,435 A | * | 12/1994 | Genero et al. | 384/448 |
| 5,470,157 A | * | 11/1995 | Dougherty et al. | 384/448 |
| 5,550,467 A | * | 8/1996 | Goossens | 324/173 |
| 5,670,874 A | * | 9/1997 | Miyazaki et al. | 324/174 |
| 5,873,658 A | * | 2/1999 | Message et al. | 384/448 |
| 6,457,869 B1 | * | 10/2002 | Smith et al. | 384/448 |
| 6,692,153 B2 | * | 2/2004 | Ohtsuki et al. | 384/448 |

FOREIGN PATENT DOCUMENTS

JP 2000-211311 8/2000

* cited by examiner

Primary Examiner—Thomas R. Hannon
(74) Attorney, Agent, or Firm—McGinn IP Law Group, PLLC

(57) ABSTRACT

A rolling bearing apparatus includes a sensor cover capable of avoiding a pulser ring from being damaged by the sensor cover with excellent positional accuracy relative to the pulser ring or the like. The rolling bearing apparatus includes a structure in which whereas an outer peripheral edge of a sensor main body of a sensor cover is folded to bend to an inner side of a bearing and a conical portion as a fitting portion is formed at a folded to bend portion thereof, a conical portion as a fitted portion for fitting the fitting portion is formed at an inner peripheral surface of an outer ring and a position in an axial direction of the sensor cover relative to a pulser ring is set to position by fitting the two conical portions.

17 Claims, 5 Drawing Sheets

FIG. 1

DIRECTION OF AXIS OF THE PULSER RING

FIG. 5

ROLLING BEARING APPARATUS

BACKGROUND OF THE INVENTION

1. Field of the Invention

The present invention relates to a rolling bearing apparatus for rotatably supporting a wheel at a suspension of an automobile and having a rotation detecting apparatus for detecting a rotational speed and a rotational direction of the wheel, particularly relates to a rolling bearing apparatus having a pulser ring in the rotation detecting apparatus.

2. Description of the Related Art

There is a case in which a rolling bearing apparatus for supporting a wheel is installed with a rotation detecting apparatus used for controlling an antilock brake system (ABS) or the like in, for example, an automobile or the like. A rotation detecting apparatus is constituted to include a pulser ring and a sensor. The pulser ring is attached to a rotating ring of the rolling bearing apparatus and the sensor is attached to a fixed ring of the rolling bearing apparatus in a state of being opposed to the pulser ring. A state of rotating the pulser ring rotated in synchronism with the rotating ring is detected by the sensor to thereby detect a state of rotating a wheel. Generally, with regard to the above-described pulser ring, a magnetic property thereof is changed alternately in a circumferential direction and there are a magnetic piece type which is constituted by a metal ring in, for example, a combteeth shape as well as a metal ring provided with through holes at several portions of the circumference and a magnet type in which a support ring made of a metal is attached with a ring-like magnet constituted by arranging magnetic poles alternately in a circumferential direction.

The pulser ring is provided on a side of the rotating ring at one end portion in an axial direction of a ring-like space between the rotating ring and the fixed ring in a diameter direction interposed with a rolling is member of a ball or the like. In order to protect a portion of installing the pulser ring in the ring-like space such that dust and dirt or mud water or the like is prevented from invading the portion from outside, a sensor cover for partitioning the ring-like space from outside is provided. In the case of the prior art, the sensor cover is fitted to a side of the fixed ring opposed to the rotating ring provided with the pulser ring and the pulser ring is installed to seal by a seal member between the sensor cover and a metal ring or the like for fixing the pulser ring to the rotating ring (refer to, for example, Patent Reference 1).

[Patent Literature 1]: JP-A-2000-211311 (total pages, total drawings)

However, in the case of the above-described prior art, fitting of the sensor cover to the rotating ring is constituted by a structure of only fitting a cylindrical portion of the sensor cover to the rotating ring by press-fitting and therefore, it is not clear to what degree the sensor cover is fitted thereto in an axial direction. Therefore, there is a concern that the sensor cover is improperly pushed into an inner side thereof in the axial direction and particularly when the sensor cover and the pulser ring are arranged to be opposed to each other in the axial direction, there is a concern that the sensor cover is brought into contact with the pulser ring to damage the pulser ring. Further, even when the sensor cover is fitted thereto such that the sensor cover is not brought into contact with the pulser ring, in the case in which the rolling bearing apparatus are laminated to pile up for storage or transportation, there is a concern that the sensor cover is pushed thereinto by a bolt or the like and there is a concern that the pulser ring is damaged by the sensor cover which is pushed thereinto. Further, when a position of fitting the sensor cover is insufficient, an interval (clearance, air gap) in the axial direction between the pulser ring and the sensor is prolonged by being restricted by the position of the sensor cover and therefore, there is a concern that magnetic information of the pulser ring cannot accurately be detected by the sensor.

Particularly, when the clearance is intended to be as small as possible, the sensor cover and the pulser become further proximate to each other, or thin-walled formation of the sensor cover is achieved and therefore, the above-described problem in laminating to pile up the rolling bearing apparatus is liable to be posed.

SUMMARY OF THE INVENTION

The invention has been carried out in view of the above-described actual situation and it is a problem thereof to be resolved to provide a bearing rolling apparatus capable of avoiding a pulser ring from being damaged and capable of installing a sensor cover to the pulser ring or the like with excellent positional accuracy.

A rolling bearing apparatus according to the invention is characterized in a rolling bearing apparatus comprising a rotating ring having a flange for supporting a wheel, a fixed ring which is supported on an outer diameter side of the rotating ring concentrically with the rotating ring and is not rotated, a plurality of pieces of rolling members rollably provided between the rotating ring and the fixed ring, a pulser ring which is installed at an outer peripheral surface on one end side in an axial direction of the rotating ring and a magnetic property of which is changed alternately in a circumferential direction, and a sensor cover made of a nonmagnetic material installed to an inner peripheral surface on one end side in the axial direction of the fixed ring by making one face thereof proximate to the pulser ring and closing a ring-like space between the fixed ring and the rotating ring, wherein a sensor supported by the fixed ring or a portion of a vehicle body is proximate to or brought into contact with other face of the sensor cover to be opposed to the pulser ring in the axial direction via the sensor cover, the rolling bearing apparatus comprising a structure in which whereas an outer peripheral edge of the sensor cover is folded to bend to an inner side of a bearing and a fitting portion is formed at least at a portion of the folded portion, a fitted portion for fitting the fitting portion is formed at a predetermined position of the inner peripheral surface of the fixed ring and a position in the axial direction of the sensor cover relative to the pulser ring is set to position by fitting the fitting portion of the sensor cover to the fitted portion of the fixed ring.

According the rolling bearing apparatus of the invention, by setting the position of the sensor cover in the axial direction relative to the pulser ring by fitting the fitting portion to the fitted portion of the fixed ring, the sensor cover can be disposed at a proper constant position which does not hamper detection or the like of the pulser ring. Further, even when the sensor cover is more or less exerted with external force as in the case of, for example, laminating to pile up the rolling bearing apparatus, the position in the axial direction of the sensor cover is restricted by fitting the fitting portion and the fitted portion and therefore, the sensor cover is not pushed from the proper position. Therefore, a drawback of moving the sensor cover to interfere with the pulser ring is avoided.

According to the rolling bearing apparatus of the invention, preferably, the fitting portion is constituted by a structure of a taper face in a ring-like shape a diameter of which is gradually reduced in a fitting direction and the fitted portion is constituted by a structure of a taper face in a ring-like shape a diameter of which is gradually reduced in the fitting direction. Further, preferably, the fitting portion is constituted by a projected portion in a ring-like shape and the fitted portion is constituted by a groove in a ring-like shape fitted with the projected portion.

In this case, the sensor cover is positioned in the axial direction by fitting the two taper faces or fitting the projected portion and the ring-like groove and therefore, working for providing the structure of positioning the sensor cover in the axial direction is simplified and the sensor cover is preferably prevented from being drawn.

In the drawings, a reference numeral 15 refers to a pulser ring; 16 to a sensor; 31 to an outer ring; 32 to an inner ring; 33 to a ball; 37 to a sensor cover; and a reference sign K refers to an opening portion.

DETAILED DESCRIPTION OF THE PREFERRED EMBODIMENTS

<First Embodiment>

Figure 1:
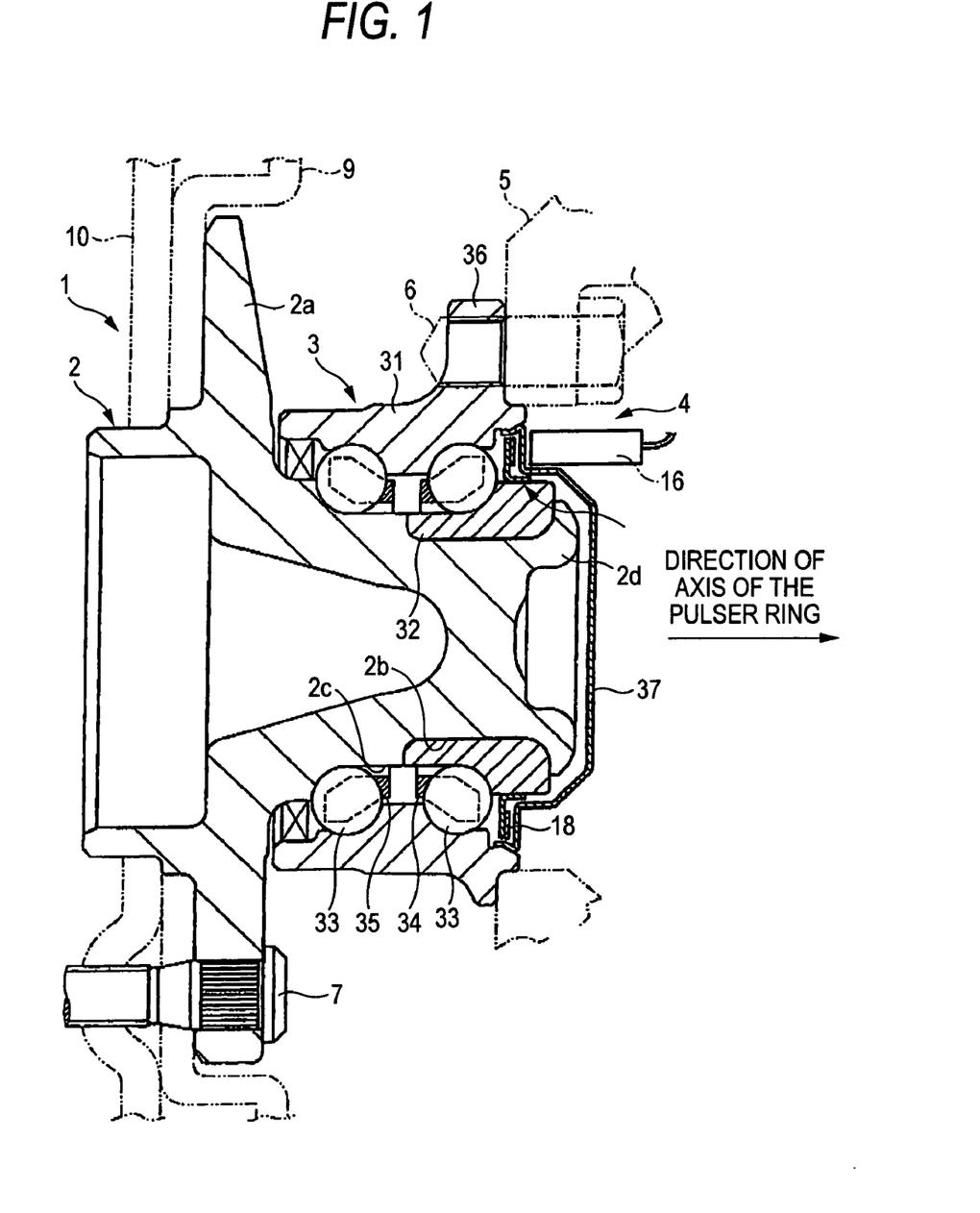
FIG. 1 is a sectional view of a rolling bearing apparatus according to First Embodiment of the invention.
Figure 2:
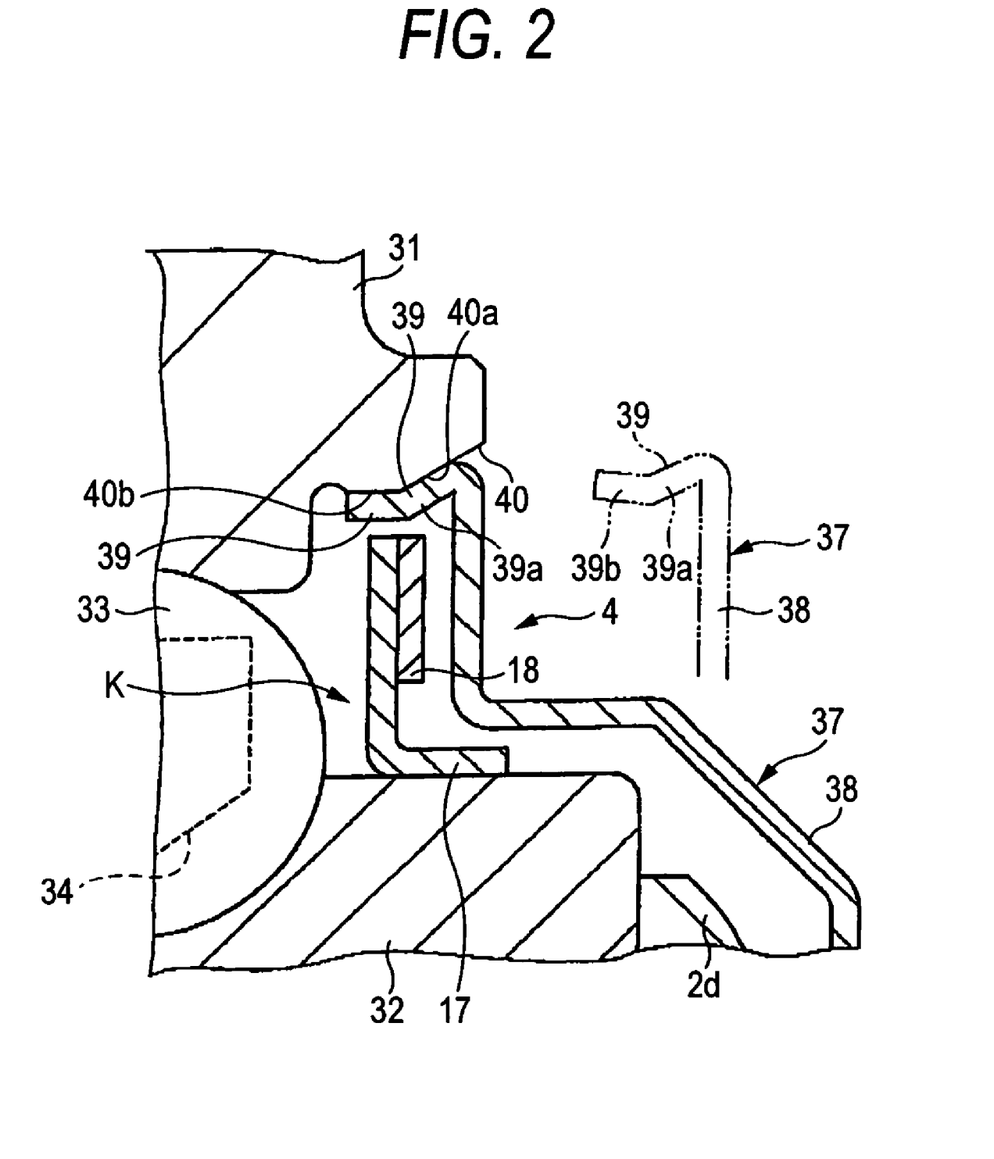
FIG. 2 is a sectional view enlarging an essential portion of FIG. 1.

FIG. 1 and FIG. 2 show First Embodiment of the invention. Here, there is taken an example of a rolling bearing apparatus used on a side of a driven wheel of an automobile. FIG. 1 is a sectional view showing a total of the rolling bearing apparatus and the like and FIG. 2 is a sectional view enlarging an essential portion in FIG. 1.

A rolling bearing apparatus 1 of First Embodiment includes a hub shaft 2, a double row rolling bearing 3 and a rotation detecting apparatus 4. The hub shaft 2 includes a flange 2a directed to an outer side in the diameter direction at an outer peripheral surface thereof on a vehicle outer side. The double row rolling bearing 3 is provided at an outer peripheral surface of the hub shaft 2 on a vehicle inner side of the flange 2a of the hub shaft 2. The double row rolling bearing 3 is constituted by a double row angular ball bearing directed to an outer side and includes a single outer ring 31 having two rows of track grooves, a single inner ring 32 having one row of an inner ring track outwardly fitted to a small diameter outer peripheral surface 2b of the hub shaft 2, a plurality of balls 33 as rolling members arranged in two rows and two crown type retainers 34, 35 and one inner ring is constituted by a large diameter outer peripheral surface 2c of the hub shaft 2. The inner ring 32 and the hub shaft 2 constitute a rotating ring and the outer ring 31 constitutes a fixed ring which is supported on an outer diameter side of the rotating ring concentrically with the rotating ring and is not rotated. That is, the plurality of balls 33 are interposed in a state of being aligned in a peripheral direction in double rows in a state of being disposed in a ring-like space between the large diameter outer peripheral surface 2c of the hub shaft 2 and the outer peripheral surface of inner ring 32 and the inner peripheral surface of the outer ring 31 and rotatably supported relative to the outer ring 31 as the fixing ring and the hub shaft 2 and the inner ring 32 as the rotating ring.

The outer ring 31 includes a flange 36 directed to an outer side in the diameter direction at an outer peripheral surface on a vehicle outer side thereof. A sensor cover 37 for hermetically sealing inside of the bearing is mounted to the inner peripheral surface on the vehicle inner side of the outer ring 31.

The double row rolling bearing 3 is unrotatably attached to a vehicle body by fixing the flange 36 of the outer ring 31 to a carrier (or knuckle) 5 constituting a portion of the vehicle body by a bolt 6. A disc rotor 9 of a disc brake apparatus and a wheel 10 are fixed to an outer side face on a vehicle outer side of the flange 2a of the hub shaft 2 by bolts 7 mounted to penetrate at several portions in the circumference of the flange 2a.

The rotation detecting apparatus 4 detects a rotational state of a rotational speed, a rotational direction or the like of the hub shaft 2. The rotation detecting apparatus 4 includes a pulser ring 15 and a sensor 16. The pulser ring 15 is arranged to be proximate to one face on an inner side of the sensor cover 37 and the sensor 16 is arranged to fix to a vehicle body side by being proximate to other face of an outer side of the sensor cover 37. In this case, the sensor 16 may be brought into contact with the sensor cover 37.

The pulser ring 15 is arranged at ends of the outer ring 31 and the inner ring 32 on one side in the axial direction (vehicle inner side). Describing in details, a ring-like space K formed to recess to an inner side in the axial direction is provided at the end portion on the vehicle inner side of the outer ring 31 and the pulser ring is 15 is fitted to fix to a shoulder portion of the outer peripheral surface of the inner ring 32 facing the ring-like space K.

The pulser ring 15 includes a support ring 17 attached to the shoulder portion of the outer peripheral surface of the inner ring 32 and a ring-like magnet 18 attached to the support ring 17. The ring-like magnet 18 is constituted by a magnetized rubber ring having a constitution in which, for example, a rubber material mixed with a magnetic powder of ferrite is constituted by a shape of a ring-like plate and regions thereof at equal intervals in the circumference are alternately magnetized into N poles and S poles.

The sensor 16 is attached to the vehicle side in a state in which a central position thereof for carrying out the detection and a magnetic field generating portion of the ring-like magnet 18 are made to coincide with each other in the diameter direction and the sensor cover 37 is disposed therebetween to be opposed to the ring-like magnet 18 in the axial direction via a predetermined interval. The sensor 16 outputs an electric signal in correspondence with the rotational state of the ring-like magnet 18. The sensor 16 is a so-to-speak active sensor constituted by a magnetic detecting element constituting a detecting portion an output of which is changed in accordance with a flow of a magnetic flux of a hole element, a magnetoresistive element or the like and IC or the like integrated with a waveform shaping circuit for shaping an output waveform of the magnetic detecting element.

According to the rotation detecting apparatus 4, when the pulser ring 15 is rotated in accordance with rotation of the inner ring 32 integral with the hub shaft 2, a change in the magnetic flux of the pulser ring 15 is detected by the sensor 16. A detected rotational output of the rotation detecting apparatus 4 is utilized for detecting the rotational speed of the wheel 10 attached to the hub shaft 2.

The structure of the sensor cover 37 will be explained.

The sensor cover 37 is made of a nonmagnetic material of aluminum, copper or the like and includes a cover main body 38 closing the ring-like space K. An outer peripheral edge of the cover main body 38 is folded to bend to an inner side of the bearing. The folded to bend portion 39 includes a conical portion 39a as a fitting portion having a ring-like structure a diameter of which is gradually reduced in a fitting direction and a cylindrical portion 39b as a contacting portion having a constant diameter in the fitting direction from the conical portion 39a over to a front end thereof.

The cover main body 38 is constituted by a shape of being projected to the vehicle inner side to be able to cover the inner ring 32 and a calking portion 2d for calking the hub shaft 2 to the inner ring 32. The folded to bend portion 39 of the cover main body 38 is inwardly fitted in a state of being press-fitted to an inner peripheral surface 40 of the outer ring 31 facing the opening K at an end portion on one side thereof in the axial direction.

The inner peripheral surface 40 of the outer ring 31 is constituted by a conical portion 40a as a fitted portion constituted by a ring-like structure a diameter of which is gradually reduced in the fitting direction and a cylindrical portion 40b as a contacted portion a diameter of which is made to be constant in the fitting direction on the inner side of the conical portion 40a in the axial direction.

Further, as shown by two-dotted chain lines in FIG. 2, the diameter of the folded to bend portion 39 of the sensor cover 37 is more or less made to be larger than the inner diameter of the inner peripheral surface 40 of the outer ring 31 to the outer side in a state before being fitted to the inner peripheral surface 40 of the outer ring 31. Thereby, in a state in which the conical portion 39a of the folded to bend portion 39 of the sensor cover 37 is press-fitted into the conical portion 40a of the inner peripheral surface 40 of the outer ring 31, an elastic urge force of the conical portion 39a is exerted to the conical portion 40a of the outer ring 31 such that the conical portion 39a is elastically deformed to a state of reducing the diameter to diverge to an outer side. By exerting the elastic urge force, a contact friction force of the fitting portion 39a of the senor cover 37 exerted to the conical portion 40a of the outer ring 31 is increased to operate as a position holding force in the axial direction. Further, by bringing the two conical portion 39a, 40a into contact with each other, positioning in the axial direction is also carried out, thereby, in a state in which the conical portion 39a of the sensor cover 37 is positioned, a position of the sensor cover 37 in the axial direction relative to the pulser ring 15 is positioned in a predetermined state. Therefore, the sensor cover 37 can be avoided from being improperly proximate to the pulser ring 15 and also a gap between the sensor 16 and pulser ring 15 can be brought into a desired state.

Further, according to the constitution of positioning the sensor cover 37 in the axial direction by bringing the two conical portions 39a, 40a into contact with each other, in fitting the sensor cover 37 to one end in the axial direction of the outer ring 31, the sensor cover 37 is moved along the axial direction and the conical portion 39a is hardly varied to the side of reducing the diameter until faces of the two conical portion 39a, 40a are brought into contact with each other and therefore, the dimension of the outer diameter of the pulser ring 15 can be set to be large by an amount of reducing the variation to thereby achieve high accuracy formation of the detection. In this case, the conical portion 39a of the folded to bend portion 39 of the sensor cover 37 and the conical portion 40b of the inner peripheral surface 40 of the outer ring 31 are brought into contact with each other.

<Second Embodiment>

Figure 3:
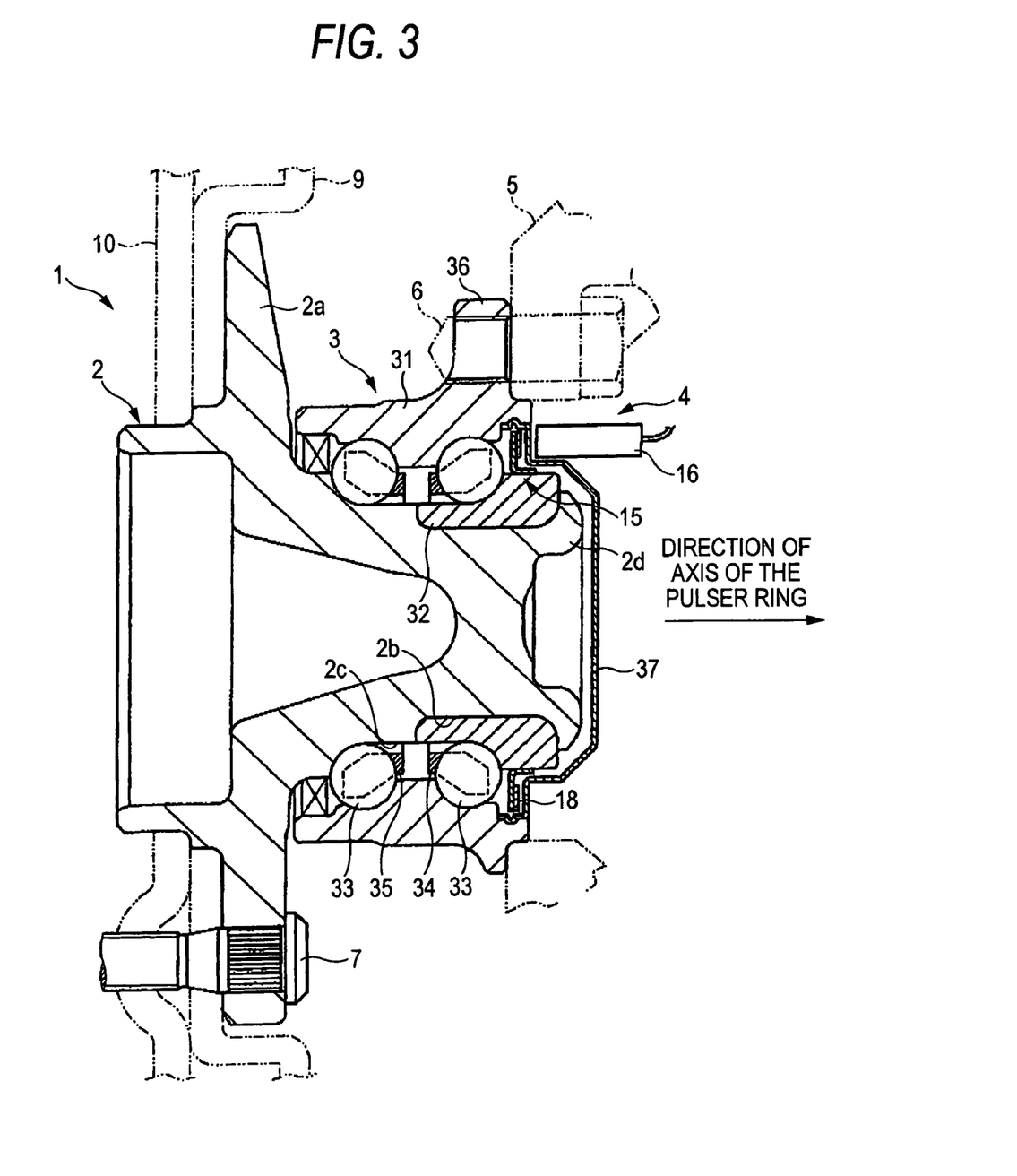
FIG. 3 is a sectional view of a rolling bearing apparatus according to Second Embodiment of the invention.
Figure 4:
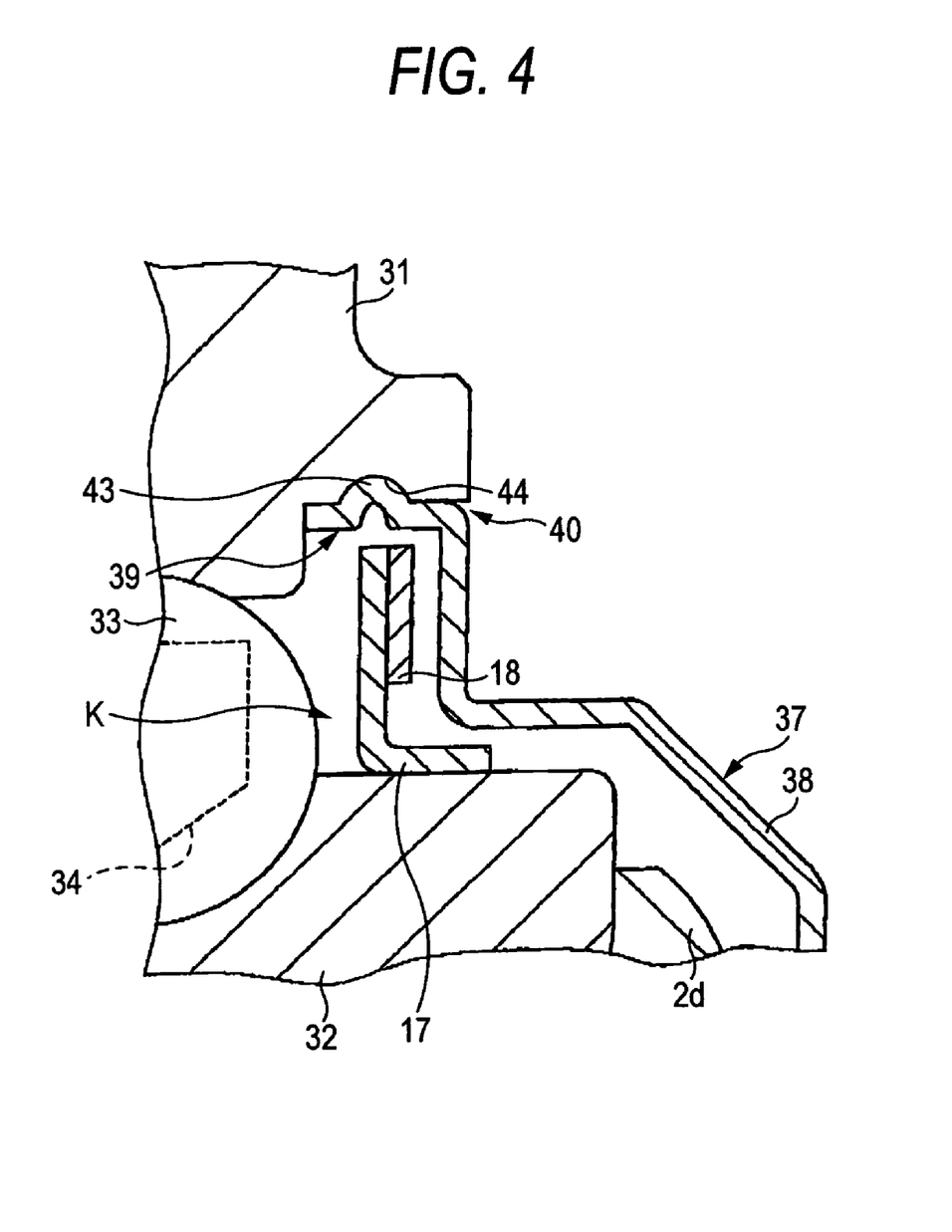
FIG. 4 is a sectional view enlarging an essential portion of FIG. 3.

Next, an explanation will be given of a rolling bearing apparatus according to Second Embodiment of the invention in reference to FIG. 3 and FIG. 4. FIG. 3 is a sectional view showing a total of a rolling bearing apparatus and the like and FIG. 4 is a sectional view enlarging an essential portion in FIG. 3. Further, a detailed explanation will be omitted of a structure similar to that of First Embodiment, mentioned above, and the same reference notation will be attached thereto.

In reference to FIG. 3 and FIG. 4, according to Second Embodiment, the folded to bend portion 39 of the senor cover 37 is constituted by a cylindrical shape. Substantially at a central portion of a width in the axial direction of the bent portion 39 in the cylindrical shape, there is formed a projected portion 43 in a ring-like shape projected to the outer side in the diameter direction over an entire periphery in the peripheral direction as a fitting portion achieving a function equivalent to that of the conical portion 39a of First Embodiment. Meanwhile, substantially at a middle portion of a width in the axial direction of the inner peripheral surface 40 of the outer ring 31, there is formed a recessed groove 44 in a ring-like shape along the peripheral direction as a fitted portion achieving a function equivalent to that of the conical portion 40a of First Embodiment.

Therefore, when the sensor cover 37 is going to be fitted to the outer ring 31 along the axial direction, the projected portion 43 is engaged with the recess groove 44 and in a state in which the projected portion 43 is engaged with the recess groove 44, positions of portions thereof in contact with respective engaged counterparts are restricted in the axial direction and therefore, the sensor cover 37 is positioned in the axial direction. Further, in that state, also movement of the position of the sensor cover 37 for drawing out from the outer ring 31 to the vehicle inner side is restricted and therefore, the constitution functions to prevent the sensor cover 37 from being drawn.

Further, positions of portions of forming the projected portion 43 and the recess groove 44 are determined such that the face portion of the sensor cover 37 opposed to the pulser ring 15 is positioned in the axial direction with a predetermined constant interval therebetween in view of a relationship with a position of installing the pulser ring 15. Thereby, in the state in which the projected portion 43 of the sensor cover 37 is fitted to the recess groove 44, the sensor cover 37 is prevented from interfering with or being brought into contact with the pulser ring 15 and proper clearance is maintained between the pulser ring 15 and the sensor 16.

Although according to Second Embodiment, mentioned above, the projected portion 43 is constituted over an entire periphery, a portion thereof may be interrupted in the peripheral direction. Further, pluralities of the projected portions 43 and the recess grooves 44 may be provided in the axial direction. Further, there may be constituted a positioning structure having a constitution of combining the positioning portion by the taper of First Embodiment, mentioned above, and the positioning portion by the projected portion and the recess groove of Second Embodiment <Third Embodiment>

Figure 5:
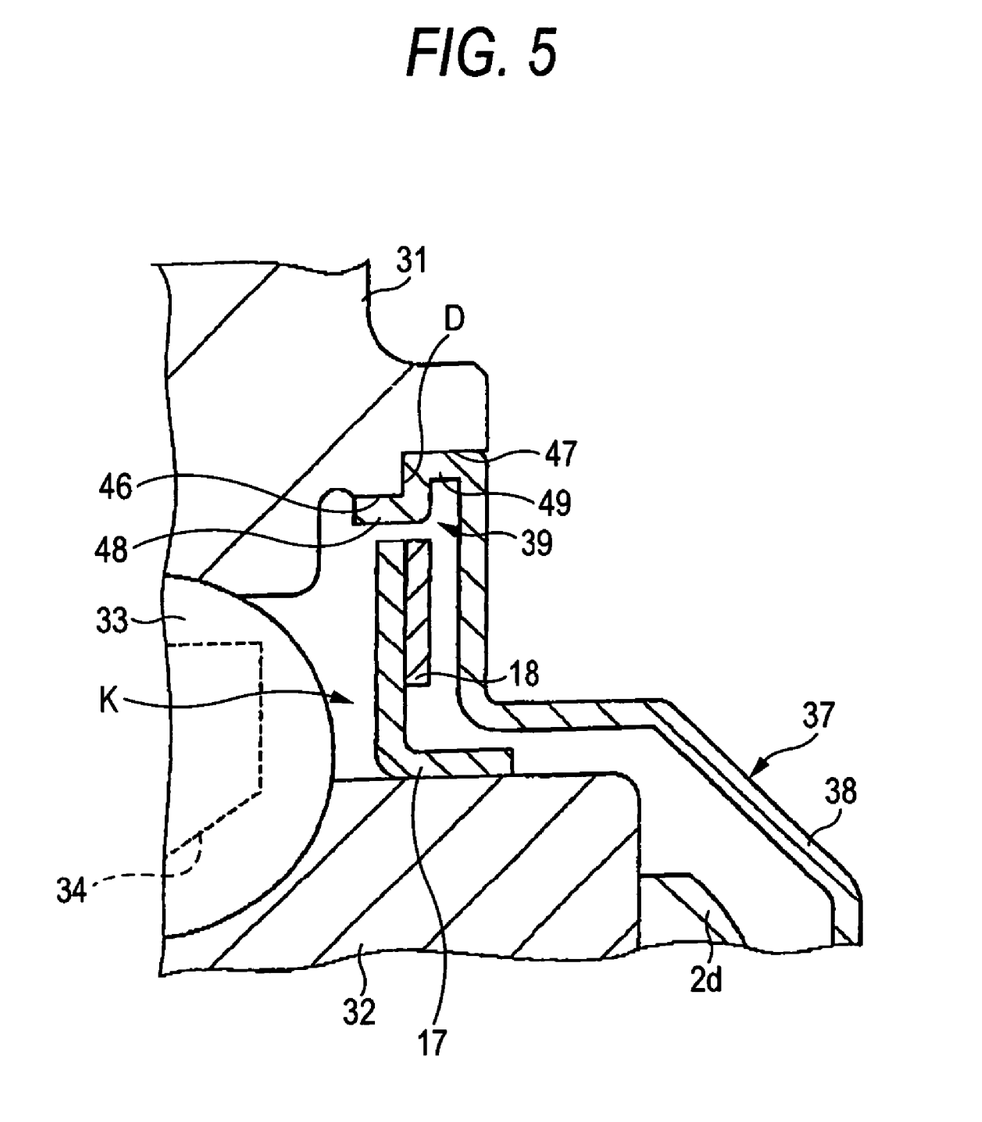
FIG. 5 is a sectional view enlarging an essential portion of a rolling bearing apparatus according Third Embodiment of the invention.

Explaining a rolling bearing apparatus according to Third Embodiment of the invention in reference to FIG. 5, according to Third Embodiment, the inner peripheral surface 40 of the outer ring 31 includes a small diameter portion 46 as a contacted portion and a large diameter portion 47 as a fitted portion, whereas an interval between the small diameter portion 46 and the large diameter portion 47 is made to constitute a stepped difference portion D of a face along the diameter direction, in accordance with the stepped difference structure, also the folded to bend portion 39 for fitting the sensor cover 37 to the outer ring 31 is formed with a small diameter fitting portion 48 as a contacting portion and a large diameter cylinder portion 49 as a fitting portion. In the case of Third Embodiment, when the folded to bend portion 39 is going to press-fit to the outer ring 31, the position to the inner side in the axial direction is restricted by a portion of the stepped difference portion D, thereby, the sensor cover 37 is positioned in the axial direction.

According to the invention, a rolling bearing apparatus provided with a sensor cover with excellent positional accuracy to a pulser ring or the like can be provided.

What is claimed is:

1. A rolling bearing apparatus comprising:
   a rotating ring comprising a flange for supporting a wheel;
   a fixed ring which is supported on an outer diameter side of the rotating ring concentrically with the rotating ring and is not rotated;
   a plurality of rolling members rollably provided between the rotating ring and the fixed ring;
   a pulser ring which is installed at an outer peripheral surface on one end side in an axial direction of the rotating ring and a magnetic property of which is changed alternately in a circumferential direction;
   a sensor cover made of a nonmagnetic material installed to an inner peripheral surface on one end side in an axial direction of the fixed ring by making one face thereof proximate to the pulser ring and closing a ring-like space between the fixed ring and the rotating ring; and
   a sensor supported by at least one of the fixed ring and a portion of a vehicle body is proximate to or brought into contact with another face of the sensor cover to be opposed to the pulser ring in the axial direction via the sensor cover,
   wherein an outer peripheral edge of the sensor cover comprises a folded portion folded to an inner side of a bearing and a fitting portion formed at least at a portion of the folded portion,
   wherein a fitted portion for fitting the fitting portion is formed at a predetermined position of an inner peripheral surface of the fixed ring, and
   wherein a position in the axial direction of the sensor cover relative to the pulser ring is set to position by fitting the fitting portion of the sensor cover to the fitted portion of the fixed ring.

2. The rolling bearing apparatus according to claim 1, wherein the fitting portion comprises a structure of a taper face in a ring-like shape, a diameter of which is gradually reduced in a fitting direction, and
   wherein the fitted portion comprises a structure of a taper face in a ring-like shape, a diameter of which is gradually reduced in the fitting direction.

3. The rolling bearing apparatus according to claim 1, wherein the fitting portion comprises a projected portion in a ring-like shape, and
   wherein the fitted portion comprises a groove in a ring-like shape fitted with the projected portion.

4. The rolling bearing apparatus according to claim 1, wherein said sensor cover is disposed at a constant position that does not hamper detection of said pulser ring.

5. The rolling bearing apparatus according to claim 1, wherein the pulser ring is arranged at ends of the fixed ring and the rotating ring.

6. The rolling bearing apparatus according to claim 1, wherein said pulser ring comprises:
   a support ring attached to a portion of the outer peripheral surface of said rotating ring; and
   a magnet attached to said support ring.

7. The rolling bearing apparatus according to claim 1, wherein said sensor is attached to said vehicle body in a state in which a central position thereof for carrying out a detection and a magnetic field generating portion of the pulser ring coincide with each other in a diameter direction.

8. The rolling bearing apparatus according to claim 1, wherein said folded portion comprises:
   a conical portion as a fitting portion having a ring-like structure, a diameter of which is gradually reduced in a fitting direction; and
   a cylindrical portion as a contacting portion having a constant diameter in the fitting direction.

9. The rolling bearing apparatus according to claim 1, wherein said sensor cover comprises a main body that covers said fixed ring and a caulking portion for caulking said fixed ring to said flange.

10. The rolling bearing apparatus according to claim 1, wherein said folded portion is press-fitted to an inner peripheral surface of said rotating ring.

11. The rolling bearing apparatus according to claim 1, wherein a diameter of said folded portion of said sensor cover is larger than an inner diameter of the inner peripheral surface of the rotating ring.

12. The rolling bearing apparatus according to claim 1, wherein the inner peripheral surface of the outer ring comprises a smaller diameter portion, a contacted portion, and a large diameter portion, as said fitted portion,
   wherein an interval between the smaller diameter portion and the large diameter portion comprises a stepped difference portion.

13. The rolling bearing apparatus according to claim 1, wherein said folded portion comprises a small diameter fitting portion as a contacting portion and a large diameter cylinder portion as a fitting portion.

14. The rolling bearing apparatus according to claim 1, wherein said folded portion comprises a projection at a central portion of a width of the folded portion.

15. The rolling bearing apparatus according to claim 1, wherein by fitting the fitting portion of the sensor cover to the fitted portion of the fixed ring, the position in the axial direction of the sensor cover relative to the pulser ring is set to the position where the sensor cover does not interfere with a detection of the pulser ring.

16. A rolling bearing apparatus comprising:
   a rotating ring comprising a flange for supporting a wheel;
   a fixed ring which is supported on an outer diameter side of the rotating ring concentrically with the rotating ring and is not rotated;
   a plurality of rolling members rollably provided between the rotating ring and the fixed ring;
   a pulser ring which is installed at an outer peripheral surface on one end side in an axial direction of the rotating ring and a magnetic property of which is changed alternately in a circumferential direction;
   a sensor cover made of a nonmagnetic material installed to an inner peripheral surface on one end side in an axial direction of the fixed ring by making one face thereof proximate to the pulser ring and closing a ring-like space between the fixed ring and the rotating ring; and a sensor supported by at least one of the fixed ring and a portion of a vehicle body is proximate to or brought into contact with another face of the sensor cover to be opposed to the pulser ring in the axial direction via the sensor cover, wherein an outer peripheral edge of the sensor cover comprises a folded portion folded to an inner side of a bearing and a fitting portion formed at least at a portion of the folded portion, wherein a fitted portion for fitting the fitting portion is formed at a predetermined position of an inner peripheral surface of the fixed ring, and wherein said sensor cover is fixed to said fixed ring with a predetermined clearance relative to a direction of axis of the pulser ring.

17. A rolling bearing apparatus comprising:

a rotating ring comprising a flange for supporting a wheel;

a fixed ring which is supported on an outer diameter side of the rotating ring concentrically with the rotating ring and is not rotated;

a plurality of rolling members rollably provided between the rotating ring and the fixed ring;

a pulser ring which is installed at an outer peripheral surface on one end side in an axial direction of the rotating ring and a magnetic property of which is changed alternately in a circumferential direction;

a sensor cover made of a nonmagnetic material installed to an inner peripheral surface on one end side in an axial direction of the fixed ring by making one face thereof proximate to the pulser ring and closing a ring-like space between the fixed ring and the rotating ring; and a sensor supported by at least one of the fixed ring and a portion of a vehicle body is proximate to or brought into contact with another face of the sensor cover to be opposed to the pulser ring in the axial direction via the sensor cover, wherein a plurality of fitting portions are formed on an outer peripheral edge of the sensor cover along an outer peripheral, wherein a plurality of fitted portions for fitting the fitting portion are formed on an inner peripheral surface of the fixed ring, and wherein said sensor cover is fixed to said fixed ring with a predetermined clearance relative to a direction of an axis of the pulser ring.

* * * * *